United States Patent [19]
Kaneko et al.

[11] Patent Number: 4,871,464
[45] Date of Patent: Oct. 3, 1989

[54] METHOD FOR EXTRACTING METAL IONS

[75] Inventors: Tsugio Kaneko; Fumiya Ishikawa; Yoshinobu Nishiyama; Toshiharu Shibata, all of Kitakyushu, Japan

[73] Assignee: Mitsubishi Chemical Industries Limited, Tokyo, Japan

[21] Appl. No.: 158,740

[22] Filed: Feb. 23, 1988

[30] Foreign Application Priority Data

Feb. 23, 1987 [JP] Japan ................................. 62-39552

[51] Int. Cl.$^4$ ............................................. E01D 15/04
[52] U.S. Cl. .................................... 210/682; 210/684; 210/688
[58] Field of Search ............... 210/638, 651, 654, 660, 210/663, 665, 666, 668, 681, 682–684, 688; 423/24, 100, 139; 204/DIG. 13

[56] References Cited

U.S. PATENT DOCUMENTS 3,230,036 1/1966 Kappelman et al.
4,702,838 10/1987 Babcock et al. .................... 210/651

FOREIGN PATENT DOCUMENTS 026132 9/1980 European Pat. Off.
1188061 7/1962 Fed. Rep. of Germany.

Primary Examiner—Frank Sever
Attorney, Agent, or Firm—Oblon, Spivak, McClelland, Maier & Neustadt

[57] ABSTRACT

A method for extracting metal ions by contacting an aqueous solution containing the metal ions with an acidic phosphoric acid ester, characterized in that as the acidic phosphoric acid ester, an acidic phosphoric acid ester of the formula:

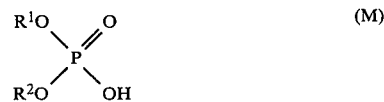

wherein $R^1$ is an alkylphenyl group having from 7 to 18 carbon atoms and $R^2$ is an alkyl group having from 1 to 18 carbon atoms, is used.

2 Claims, No Drawings

METHOD FOR EXTRACTING METAL IONS

The present invention relates to a method for extracting metal ions from an aqueous solution containing the metal ions. More particularly, the present invention relates to a method for extracting metal ions from an aqueous solution containing the metal ions by using an acidic phosphoric acid ester having two different groups i.e. an alkylphenyl group and an alkyl group, as an extracting agent. The present invention is effective particularly when the acidity of an aqueous solution containing rare earth element ions is high and/or when such an aqueous solution contains phosphoric acid.

In recent years, it has been proposed to use an extracting agent of a type such as a phosphoric acid ester type, a hypophosphite type or a carboxylic acid type. Among them, di-(2-ethylhexyl) phosphate (hereinafter referred to as "D2EHPA") has a relatively large extracting ability and is well known as an excellent extracting agent for the separation and purification of an rare earth element. However, the acidity of an aqueous solution wherey D2EHPA functions effectively, is at a pH level of at least 0. Accordingly, it is thereby impossible to extract a rare earth element directly from an aqueous solution containing phosphoric acid in high yield.

On the other hand, it has been proposed to extract and separate a rare earth element from a phosphoric acid-containing aqueous solution having an acidity at a pH level of at most 0 by using di-[(1,1,3,3-tetramethylbutyl)phenyl]phosphate as the extracting agent (Japanese Unexamined Patent Publication No. 63825/1981). However, this extracting agent has an extracting ability so high that it is necessary to use a strong acid such as hydrofluoric acid or a hydrofluoric acid-phosphoric acid system in order to reversely extracting the extracted rare earth element to an aqueous phase.

The present inventors have conducted extensive research to overcome such problems of the conventional techniques and as a result, have found that when a certain specific acid phosphoric acid ester is employed as the extracting agent, a metal can easily be extracted and separated even from an aqueous solution having an acidity at a pH level of at most 0 or from an aqueous solution containing phosphoric acid, that it is possible to conduct reverse extraction by using sulfuric acid, a sulfuric acid-sulfuric acid salt (particularly sodium sulfate) system, hydrochloric acid or nitric acid without using a strong acid such as hydrofluroic acid or a hydrofluoric acid-phosphoric acid system, and that the separation coefficient between aluminum ions and rare earth element ions from a phosphoric acid-containing aqueous solution, is improved. The present invention has been accomplished on the basis of such discoveries.

Namely, the present invention provides a method for extracting metal ions by contacting an aqueous solution containing the metal ions with an acidic phosphoric acid ester, characterized in that as the acidic phosphoric acid ester, an acidic phosphoric acid ester of the formula:

 (M)

wherein $R^1$ is an alkylphenyl group having from 7 to 18 carbon atoms and $R^2$ is an alkyl group having from 1 to 18 carbon atoms, is used.

Now, the present invention will be described in detail with reference to the preferred embodiments.

The metal ions to which the method of the present invention may be applied, include ions of transition metals such as yttrium, lanthanoids of atomic numbers 57 to 71, copper, zinc, titanium, iron, nickel, scandium, zirconium, hafnium, niobium, tantalum and ions of tipycal metals such as gallium and indium. The present invention is particularly suitable for extracting and separating rare earth elements such as yttrium, scandium and lanthanoids from an aqueous solution having a pH level of at most 0.

With respect to the acidity of the aqueous solution containing the metal ions, the extraction and separation are possible so long as the metal ions do not precipitate in the form of hydroxides, namely, at a pH level of at most 6. However, the advantage of using the extracting agent of the present invention is particularly remarkable at a pH level of at most 1, specially at most 0. Therefore, most preferably, the pH level is within a range of from −1 to 0.

Further, when phosphoric acid is present in the aqueous solution containing the metal ions, such phosphoric acid acts not only as a masking agent but also as a buffering agent to keep the pH at a low level, whereby the extraction rate of rare earth elements can be improved by using the acidic phosphoric acid ester of the formula M even when no adequate extraction rate is obtainable with D2EHPA as lacking in adequate extracting ability. The concentration of phosphoric acid where the extracting agent of the formula M is advantageous over D2EHPA is from 0.1 to 100 mols per mol of the rare earth element.

In the acidic phosphoric acid ester of the formula M to be used as the extracting agent of the present invention, the alkylphenyl group having from 7 to 18 carbon atoms as $R^1$ has at least one alkyl moiety at the o-, m- or p-position of a phenyl group. This alkyl moiety may be straight chain or branched. For example, it includes straight chain groups ranging from a methyl group to a dodecane group, a tert-butyl group, an iso-propyl group and a 1,1,3,3-tetramethylbutyl group. Likewise, the alkyl group having from 1 to 18 carbon atoms as $R^2$ may be straigt chain or branched. For example, it includes straight chain groups having from 1 to 18 carbon atoms, a 2-ethylhexyl group, a tert-butyl group and an iso-propyl group.

Specific examples of the acidic phosphoric acid ester practically useful include (1,1,3,3-tetramethylbutyl)phenyl-n-butyl phosphate, (1,1,3,3-tetramethylbutyl)phenyl-2-ethylhexyl phosphate, (1,1,3,3-tetramethylbutyl)-phenyl-ethyl phosphate, (tert-butyl)phenyl-n-butyl phosphate and (tert-butyl)phenyl-2-ethylhexyl phosphate. Particularly preferred is (1,1,3,3-tetramethylbutyl)phenyl-n-butyl phosphate.

In the present invention, it is preferred to use an organic solvent as a diluent and to use the above-mentioned extracting agent in a diluted form in order to lower the viscosity of the extracting agent and thereby to facilitate the extraction treatment. Suitable diluents include petroleum fractions such as kerosine, aliphatic hydrocarbons such as hexane and decane, ethers such as isopropyl ether, and aromatic hydrocarbons such as benzene, toluene, xylene and ethylbenzene. From the viewpoint of extraction operation, it is preferred to select the amount of the diluent so that the concentration of the acidic phosphoric acid ester will be from 0.1 to 1.5 mol/liter, preferably from 0.2 to 1.0 mol/liter.

Di(alkylphenyl) phosphates such as di[(1,1,3,3-tetramethylbutyl)phenyl]phosphate and di(tert-butylphenyl) phosphate used to be employed in the conventional methods, have poor solubility in an aliphatic hydrocarbon such as kerosine, and it has been difficult to prepare a solution having a concentration of 1.0 mol/liter. Whereas, the extracting agent of the formula M of the present invention has adequate solubility. Thus, in the extraction of a rare earth element, the total volume of the organic phase can be reduced, and the installation for extraction can be made compact, which is advantageous from the industrial point of view.

Further, in order to improve the liquid separation in the extraction operation, a trialkyl phosphate such as tributyl phosphate may be incorporated as a modifier to the extracting solution.

By the above described extraction operation, the metal ions are extracted to the extracting solution. For an industrial operation, the extracting solution is recycled for reuse. For this purpose, the metal is reversely extracted from the extracting solution. The reverse extraction may be conducted in accordance with a conventional method by using a mineral acid such as hydrochloric acid, nitric acid or sulfuric acid having an acidity higher than the acidity of the extracting solution from which the metal is to be reversely extracted. However, since the acidic phosphoric acid ester of the present invention has a high extracting ability, it is preferred to employ a method wherein an aqueous solution containing sulfuric acid and a sulfate of a monovalent ion such as sodium sulfate, potassium sulfate or ammonium sulfate, is contacted with the extracting solution, to precipitate a double salt of sulfuric acid with the desired metal ion and the monovalent ion.

Now, the present invention will be described in further detail with reference to Examples. However, it shoud be understood that the present invention is by no means restricted to such specific Examples.

EXAMPLE 1

(1,1,3,3-tetramethylbutyl)phenyl-n-butyl phosphate was diluted with kerosine to obtain an extracting solution having a concentration of the extracting agent of 0.5 mol/liter.

An aqueous solution of lanthanum chloride was prepared to have a concentration of 0.035 mol/liter of lanthanum chloride. The acidity of the aqueous solution was adjusted by hydrochloric acid to pH −0.4 or 0. This aqueous solution was extracted with the above extracting solution (volume of the organic phase/volume of the aqueous phase=1), whereby lanthanum was extracted to the extracting solution at pH 1. Then, the extracting solution containing lanthanum was subjected to reverse extraction with 6N hydrochloric acid (volume of the organic phase/volume of the aqueous phase=1). .

The results are shown in Table 1 as the extraction rate and the reverse extraction rate of lanthanum.

EXAMPLE 2

The operation was conducted in the same manner as in Example 1 except that the extracting solution used was prepared by diluting (1,1,3,3-tetramethylbutyl)phenylethyl phosphate with kerosine to have a concentration of the extracting agent of 0.5 mol/liter. The results are shown in Table 1.

EXAMPLE 3

The operation was conducted in the same manner as in Example 1 except that the extracting solution used was prepared by diluting (1,1,3,3-tetramethylbutyl)phenyl(2-ethyl)hexyl phosphate with kerosine to have a concentration of the extracting agent of 0.5 mol/liter.

The results are shown in Table 1.

COMPARATIVE EXAMPLE 1

The operation was conducted in the same manner as in Example 1 except that the extracting solution used was prepared by diluting D2EHPA with kerosine to have a concentration of the extracting agent of 0.5 mol/liter.

The results are shown in Table 1.

COMPARATIVE EXAMPLE 2

The operation was conducted in the same manner as in Example 1 except that the extracting solution used was prepared by diluting di(1,1,3,3-tetramethylbutylphenyl) phosphate with kerosine to have a concentration of the extracting agent of 0.5 mol/liter.

The results are shown in Table 1.

TABLE 1

|  | Extraction rate (%) | | Reverse extraction rate (%) |
| --- | --- | --- | --- |
|  | pH-0.4 | pH 0 |  |
| Example 1 | 70.7 | 93.4 | 71 |
| Example 2 | 55.1 | 78.4 | 90 |
| Example 3 | 21.5 | 57.3 | 96 |
| Comparative Example 1 | 0 | 0 | 100 |
| Comparative Example 2 | 90.2 | 99.9 | 21 |

EXAMPLE 4

An aqueous solution was prepared by dissolving 0.05 mol/liter of lanthanum chloride, 0.005 mol/liter of samarium chloride and 0.005 mol/liter of yttrium chloride, and then dissolving 1 mol/liter of aluminum chloride, adding phophoric acid in an amount of 1 mol/liter and then adjusting the acidity with hydrochloric acid to pH-0.8. This aqueous solution was extracted with the same extracting solution as used in Example 1 (volume of the organic phase/volume of the aqueous phase=8), whereby the rare earth elements and aluminum were extracted to the extracting solution at pH1. Then, the extracting solution containing the rare earth elements and aluminum was subjected to reverse extraction with 6N hydrochloric acid (volume of the organic phase/volume of the aqueous phase=1).

The results are shown in Table 2 as the extraction rate and the reverse extraction rate with respect to the respective rare earth elements and aluminum.

EXAMPLE 5

The operation was conducted in the same manner as in Example 4 except that the same extracting solution as used in Example 2 was used. The results are shown in Table 2.

EXAMPLE 6

The operation was conducted in the same manner as in Example 4 except that the same extracting solution as used in Example 3 was used. The results are shown in Table 2.

COMPARATIVE EXAMPLE 3

The operation was conducted in the same manner as in Example 4 except that the same extracting solution as used in Comparative Example 1 was used. The results are shown in Table 2.

COMPARATIVE EXAMPLE 4

The operation was conducted in the same manner as in Example 4 except that the same extracting solution as used in Comparative Example 2 was used. The results are shown in Table 2.

TABLE 2

|  | Extraction rate (%) | | | | Reverse extraction rate (%) | | | |
| --- | --- | --- | --- | --- | --- | --- | --- | --- |
|  | La | Sm | Y | Al | La | Sm | Y | Al |
| Example 4 | 60.1 | 88.3 | 100 | 34.7 | 70 | 68 | 61 | 91 |
| Example 5 | 35.1 | 72.2 | 99.0 | 33.0 | 88 | 79 | 70 | 92 |
| Example 6 | 25.3 | 69.2 | 98.9 | 30.2 | 95 | 90 | 83 | 96 |
| Comparative Example 3 | 1.8 | 62.0 | 90 | 22.5 | 100 | 95 | 86 | 99 |
| Comparative Example 4 | 79.5 | 96.8 | 100 | 35.4 | 20 | 20 | 5 | 31 |

EXAMPLES 7 to 12

The operations were conducted in the same manner as in Examples 1 to 6 except that 6N sulfuric acid was used instead of hydrochloric acid. The results are shown in Tables 3 and 4.

COMPARATIVE EXAMPLES 5 to 8

The operations were conducted in the same manner as in Comparative Examples 1 to 4 except that 6N sulfuric acid was used instead of hydrochloric acid. The results are shown in Tables 3 and 4.

TABLE 3

|  | Extraction rate (%) | | Reverse extraction rate (%) |
| --- | --- | --- | --- |
|  | pH-0.4 | pH 0 |  |
| Example 7 | 70.7 | 93.4 | 72 |
| Example 8 | 55.1 | 78.4 | 90 |
| Example 9 | 21.5 | 57.3 | 95 |
| Comparative Example 5 | 0 | 0 | 100 |
| Comparative Example 6 | 90.2 | 99.9 | 22 |

TABLE 4

|  | Extraction rate (%) | | | | Reverse extraction rate (%) | | | |
| --- | --- | --- | --- | --- | --- | --- | --- | --- |
|  | La | Sm | Y | Al | La | Sm | Y | Al |
| Example 10 | 60.1 | 88.3 | 100 | 34.7 | 75 | 71 | 63 | 90 |
| Example 11 | 35.1 | 72.2 | 99.0 | 33.0 | 88 | 81 | 69 | 90 |
| Example 12 | 25.3 | 69.2 | 98.9 | 30.2 | 96 | 92 | 85 | 94 |
| Comparative Example 7 | 1.8 | 62.0 | 90 | 22.5 | 100 | 98 | 89 | 100 |
| Comparative Example 8 | 79.5 | 96.8 | 100 | 35.4 | 21 | 16 | 2 | 30 |

According to the method of the present invention, it is possible to readily extract and separate a metal from an aqueous solution having an acidity with a pH level of at most 1 or containing phosphoric acid. Further, the reverse extraction can be made with sulfuric acid, a sulfuric acid-sulfate system, hydrochloric acid or nitric acid without using hydrofluoric acid or a hydrofluoric acid-phosphoric acid system.

Further, when the method of the present invention is applied to the separation of aluminum ions and light rare earth element ions from a phosphoric acid-containing aqueous solution, high separation coefficients can be obtained. Namely, when D2EHPA which is presently most commonly employed as the acidic phosphoric acid ester, is employed, an alkali is added to increase the extraction rate of light rare earth elements in a system where phosphoric acid, aluminum ions and rare earth element ions are coexistent, whereby the separation coefficient as between the aluminum ions and the light rare earth ions tends to be small or reversed, and it becomes difficult to extract and separate the aluminum ions and the light rare earth ions. Whereas, when the acidic phosphoric acid ester of the present invention is used, the separation coefficient as between the aluminum ions and the light rare earth ions improves, and light rare earth ions and intermediate or heavy rare earth ions can selectively be extracted. Usually, the acid decomposition solution of a phosphate type ore is under adverse conditions such that it contains phosphoric acid and has high acidity. Nevertheless, the method of the present invention can advantageously be used for the extraction and separation of rare earth elements from such an acid decomposition solution. Thus, according to the present invention, rare earth elements can be recovered from a solution for the production of phosphoric acid, which is very advantageous from an industrial point of view.

Further, when the extracting agent is di(1,1,3,3-tetramethylbutylphenyl) phosphate, the solubility of such an extracting agent in a diluent is small when an aliphatic hydrocarbon such as kerosine is used as the diluent for the extracting agent. Whereas, with the acidic phosphoric acid ester used in the present invention, a higher solubility is obtained, whereby the entire volume of the organic phase for the extraction can be made small and the installation for extraction can be made compact.

Thus, the method of the present invention is very useful from an industrial point of view.

We claim:

1. A method for extracting rare earth metal ions from an aqueous solution containing rear earth metal ions and aluminum ions, said aqueous solution having a pH of no more than about 0, or containing phosphoric acid, which comprises contacting the aqueous solution containing said rare earth metal ions and aluminum ions with an acidic phosphoric acid ester of the formula:

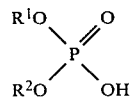

wherein $R^1$ is an alkylphenyl group having from 7 to 18 carbon atoms, and $R^2$ is an alkyl group having from 1 to 18 carbon atoms.

2. The method according to claim 1, wherein said phosphoric acid is present in the amount of about 0.1 to 100 mols per mol of rare earth element.

* * * * *